(12) United States Patent
Kim et al.

(10) Patent No.: US 7,808,609 B2
(45) Date of Patent: Oct. 5, 2010

(54) LIQUID CRYSTAL DISPLAY DEVICE AND REPAIRING METHOD THEREOF

(75) Inventors: Ki Yong Kim, Gwacheon-si (KR); Soon Sung Yoo, Goonpo-si (KR); Oh Nam Kwon, Yongin-si (KR); Heung Lyul Cho, Suwon-si (KR); Seung Hee Nam, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 350 days.

(21) Appl. No.: 11/241,913

(22) Filed: Oct. 4, 2005

(65) Prior Publication Data

US 2006/0092372 A1     May 4, 2006

(30) Foreign Application Priority Data

Oct. 29, 2004   (KR) ...................... 10-2004-0087278

(51) Int. Cl.
*G02F 1/13* (2006.01)
(52) U.S. Cl. ...................................... 349/192
(58) Field of Classification Search ................ 349/110, 349/192, 160; 324/770
See application file for complete search history.

(56) References Cited

U.S. PATENT DOCUMENTS

| | | | | |
|---|---|---|---|---|
| 5,267,066 A | * | 11/1993 | Nakai et al. | 349/110 |
| 5,280,374 A | * | 1/1994 | Nakai et al. | 349/192 |
| 5,638,199 A | * | 6/1997 | Tsubota et al. | 349/110 |
| 6,239,856 B1 | * | 5/2001 | Imura et al. | 349/192 |
| 2001/0034131 A1 | * | 10/2001 | Sato et al. | 438/700 |

FOREIGN PATENT DOCUMENTS

JP         2005189360 A  *  7/2005

* cited by examiner

*Primary Examiner*—David Nelms
*Assistant Examiner*—Jessica M Merlin
(74) *Attorney, Agent, or Firm*—McKenna Long & Aldridge LLP

(57) ABSTRACT

An LCD and an LCD repairing method are provided. The LCD repairing method includes forming a hole on a first or second substrate at a position corresponding to a defective pixel and forming a pigment in the hole. The LCD includes a first substrate on which a pixel electrode and a TFT are formed in a pixel region formed in a matrix pattern, a second substrate on which a color filter layer and a black matrix are formed, the second substrate facing the first substrate, a hole formed on an outer surface of the first or second substrate to repair a defective pixel, and a repair pattern formed in the hole.

17 Claims, 6 Drawing Sheets

LIQUID CRYSTAL DISPLAY DEVICE AND REPAIRING METHOD THEREOF

This application claims the benefit of Korean Patent Application No. 87278/2004, filed Oct. 29, 2004, which is hereby incorporated by reference for all purposes as if fully set forth herein.

BACKGROUND OF THE INVENTION

1. Field of the Invention

The present invention relates to a liquid crystal display device (LCD), and more particularly, to an LCD constructed to repair its defective cell and a repairing method thereof.

2. Discussion of the Related Art

LCDs have low power consumption and good portability and thus are considered to be a next-generation display device.

Generally, liquid crystal is manufactured as a liquid crystal cell for use in the LCD.

The liquid crystal cell is constructed in such a way that liquid crystal is filled between two glass substrates or between two transparent plastic substrates. Transparent electrodes (common electrode, pixel electrode) are formed on the substrate to apply a voltage to the liquid crystal, thereby controlling the switching on or off of the liquid crystal cell.

More specifically, the light transmittance of the LCD is controlled by a voltage applied to the transparent electrodes, and thus text and an images can be displayed by a light shutter effect.

An active matrix (AM) LCD is provided with a switching element capable of controlling whether or not to apply a voltage to each pixel. The AM LCD is widely used because it can provide high resolution and excellent reproduction of motion pictures and video.

FIG. 1 is a perspective view illustrating a portion of a related art LCD, particularly an active region thereof.

Referring to FIG. 1, upper and lower substrates 110 and 130 are disposed in such a way that they face each other and are spaced apart from each other by a predetermined distance. A liquid crystal layer 150 is interposed between the upper and lower substrates 110 and 130.

A plurality of gate and data lines 132 and 134 are arranged to intersect each other, and a thin film transistor (TFT) T is formed at an intersection of the data and gate lines 132 and 134. A pixel electrode 146 connected to the TFT T is formed in a pixel region P defined by the intersected gate and data lines 132 and 134.

Although not shown in FIG. 1, the TFT T includes a gate electrode supplied with a gate voltage, source/drain electrodes supplied with a data voltage, and a channel for controlling whether or not to apply a voltage by a difference between the gate and data voltages.

A color filter layer 112 and a common electrode 116 are sequentially formed on an inner surface of the upper substrate 110.

The color filter layer 112 includes an R/G/B color filter transmitting only light of a specific wavelength, and a black matrix disposed between the color filter layers to block light in the region where the alignment of liquid crystal is or cannot be controlled.

Upper and lower polarizers 152 and 154 are disposed on outer surfaces of the upper and lower substrates 110 and 130, respectively, to transmit only light parallel to a polarization axis. A backlight unit is disposed under the lower polarizer 154.

The LCD is completely manufactured by performing an array substrate manufacturing process for forming the switching elements and the pixel electrodes, a color filter substrate manufacturing process for forming the color filters and the common electrodes, and a liquid crystal cell process for interposing liquid crystal between the two substrates.

The liquid crystal cell process is roughly divided into an alignment layer forming process for aligning liquid crystal molecules, a cell cutting process, and a liquid crystal forming process. A polarizer is attached on an outer surface of a liquid crystal panel completed through the above processes, and a driving circuit is connected to it, thereby completing the LCD.

FIG. 2 is a view illustrating a related art process of repairing a defective cell of a liquid crystal panel.

Referring to FIG. 2, a plurality of gate and data lines 262 and 274 are formed on a liquid crystal panel 290 in such a way to intersect each other. A TFT T is formed at an intersection of the gate and data lines 262 and 274. A pixel electrode 276 is connected to the TFT T in each pixel.

A dielectric material (not shown) is interposed between the gate line 262 and the pixel electrode 276, thereby forming a storage capacitor Cst.

After the liquid crystal panel 290 is completely manufactured through this liquid crystal cell process, a cell checking process is performed for checking whether or not a defective pixel exists. This is performed by displaying a test pattern on a screen of the liquid crystal panel 290. Thereafter, any detected defective pixels are repaired.

Defects of the liquid crystal panel 290 include a color defect in each pixel, a point defect, and a light defect. The point defect includes a bright point (always-on cell) and a dark point (always-off cell). The light defect is due to disconnection between the drain electrode of TFT and the pixel electrode 276 or the broken channel of a TFT (normally white mode TN).

These defects appear when the test pattern is displayed on the liquid crystal pattern 290. The positions of defective pixels are detected and then the defective pixels are repaired.

FIG. 2 illustrates an exemplary process for repairing a defective cell I, which appears as a bright point due to a broken defect or a signal defect when a black pattern is displayed on the screen, by darkening the bright point.

A pixel electrode 276 of the defective cell I is shorted by laser from the drain electrode of TFT or is shorted by laser between the drain electrode and the source electrode of TFT. Accordingly the defective cell I is darkened to repair the bright point.

A white point A may occur due to an alignment layer printing process or environments.

Also, when the disconnection of the pixel electrode 276 from the gate line 262 and the ITO cutting process is unsuccessfully performed, the gate and data lines 262 and 274 become shorted together, thereby causing the line defect.

As above, there may occur a case where it is impossible to repair the point defect, such as the white point A. In this case, the yield and production of the liquid crystal panel is degraded.

SUMMARY OF THE INVENTION

Accordingly, the present invention is directed to an LCD and a repairing method thereof that substantially obviate one or more problems due to limitations and disadvantages of the related art.

An advantage of the present invention is to provide an LCD that is constructed to provide an easy repair process therefore by darkening its defective cell.

Additional advantage and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a method of repairing an LCD, including: forming a hole on a liquid crystal panel at a position corresponding to a defective pixel; and forming a repair pattern in the hole.

In another aspect of the present invention, there is provided a method of repairing an LCD, including: forming a hole on a first or second substrate at a position corresponding to a defective pixel; and forming a pigment in the hole.

In a further another aspect of the present invention, there is provided a method of repairing an LCD, including: forming a hole on a first or second substrate at a position corresponding to a defective pixel; and inserting a wedge into the hole.

In a still further another aspect of the present invention, there is provided an LCD including: a first substrate on which a pixel electrode and a TFT are formed in a pixel region formed in a matrix pattern; a second substrate on which a color filter layer and a black matrix are formed, the second substrate facing the first substrate; a hole formed on an outer surface of the first or second substrate to repair a defective pixel; and a repair pattern formed in the hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
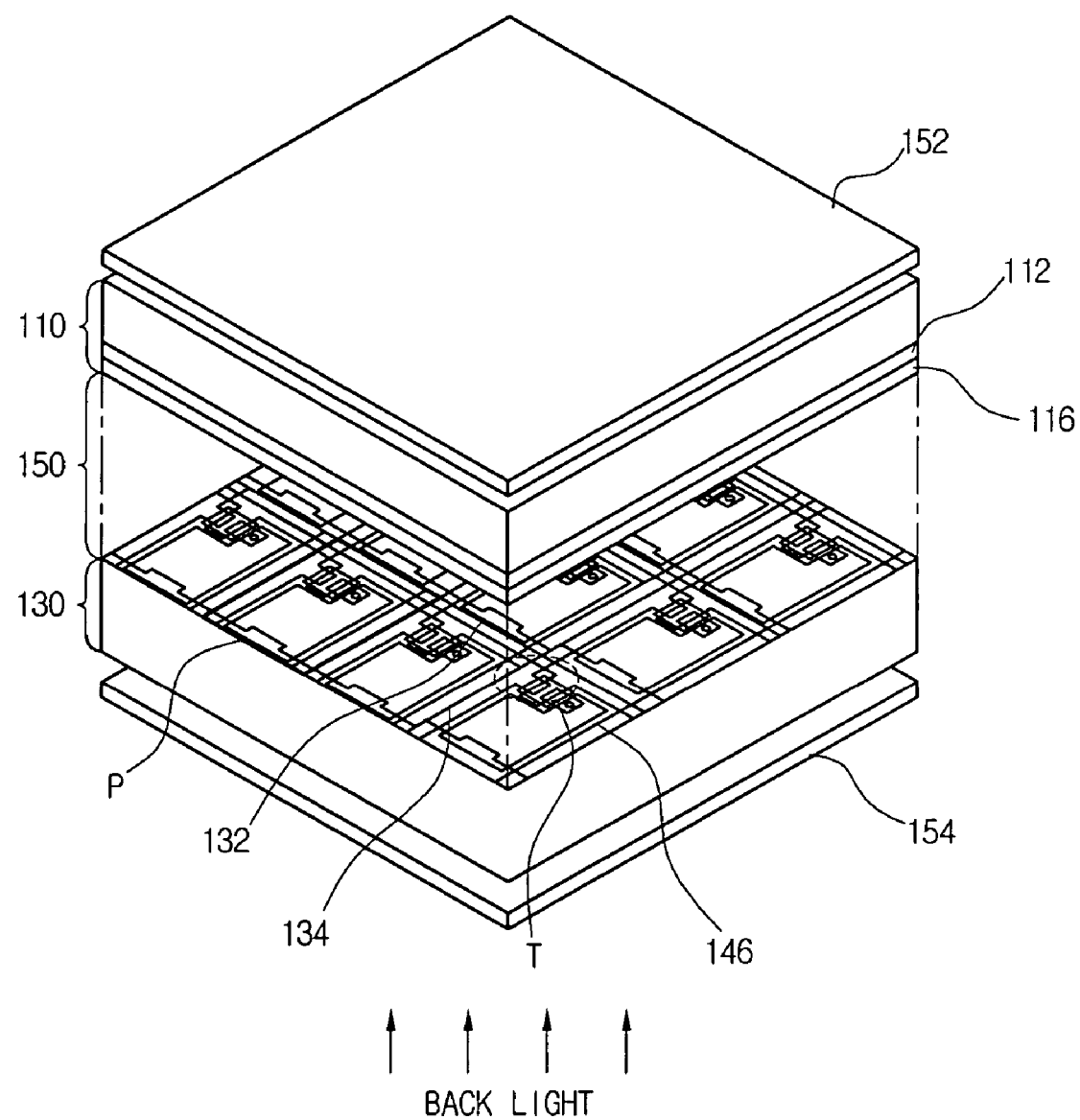
FIG. 1 is a perspective view illustrating a portion of a related art LCD.
Figure 2:
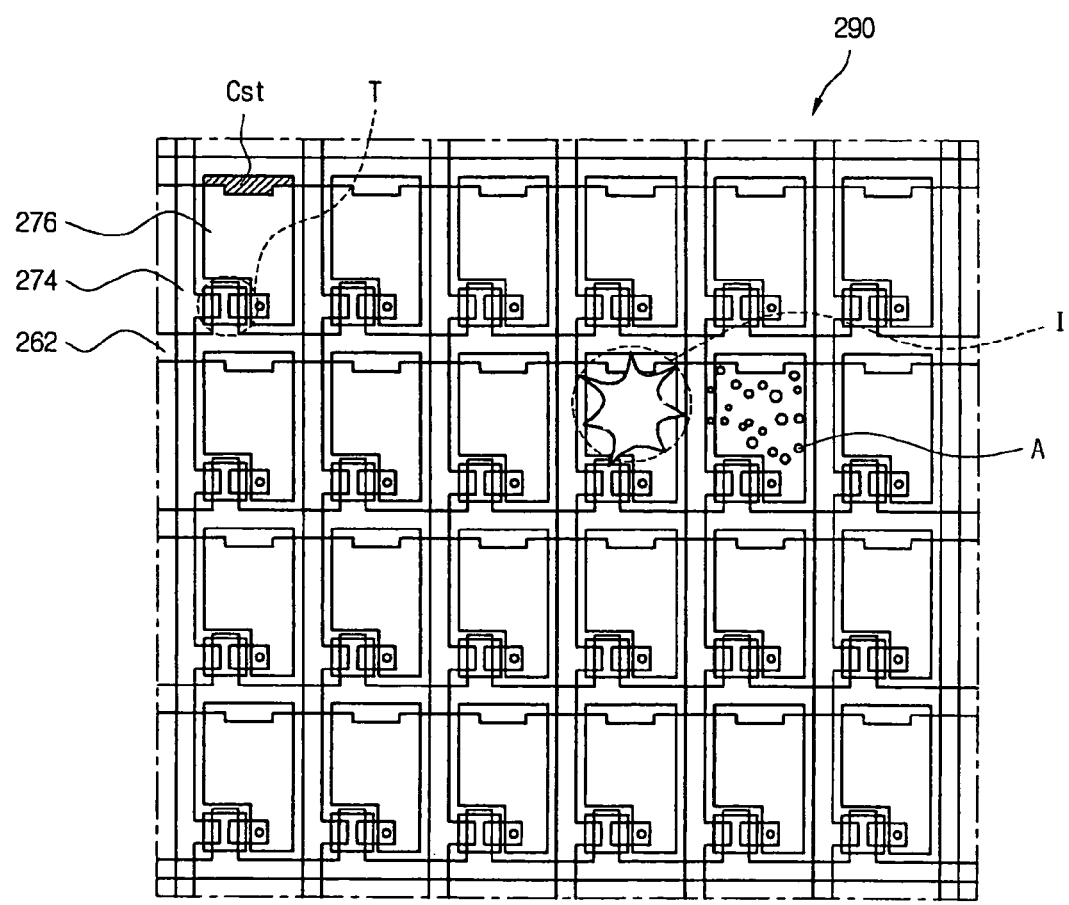
FIG. 2 is a view illustrating a related art process of repairing a defective cell of a liquid crystal panel.
Figure 3:
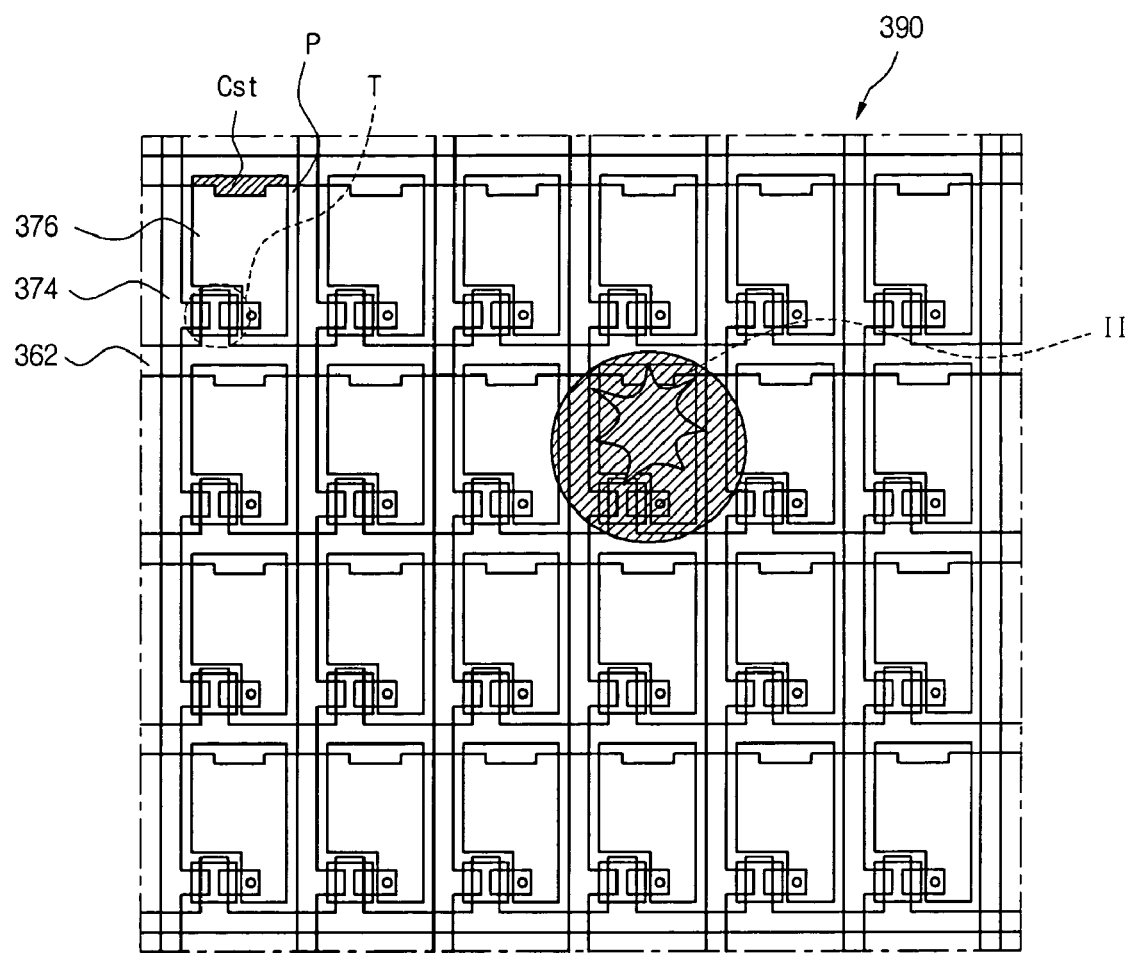
FIG. 3 is a view schematically illustrating a process of repairing a defective cell of a liquid crystal panel according to the present invention.

FIG. 3 is a schematic view illustrating a process of repairing a defective cell of a liquid crystal panel according to the present invention.

Referring to FIG. 3, a plurality of gate lines 362 are formed on a first substrate of a liquid crystal panel 390 in a first direction, and a plurality of data lines 374 are formed on the first substrate in a second direction intersecting the first direction.

A pixel region P is defined by the gate and data lines 362 and 374 intersecting each other. A TFT T is disposed at an intersection of the gate and data lines 362 and 374 in each pixel region. A pixel electrode 376 is connected to the TFT T.

A dielectric material (not shown) is interposed between the gate line 362 and the pixel electrode 376, thereby forming a storage capacitor Cst.

Although not shown in FIG. 3, a color filter layer and a common electrode are sequentially formed on a second substrate facing the first substrate.

The color filter layer includes an R/G/B color filter transmitting only light of a specific wavelength, and a black matrix disposed between the color filter layers to block light on a region where alignment of liquid crystal is not controlled.

When a bright point occurs due to a defective cell II, it is repaired by forming a darkening pattern on the first or second substrate to cover the defective cell II.

That is, a hole is formed on an outer surface of the first or second substrate at a position corresponding to the bright point by using a micro-drill. Thereafter, a material such as a pigment is filled in the formed hole, and the bright point is darkened to prevent light from being transmitted at the defective position.

The pigment may be any material capable of blocking light, such as an acryl series material or a Novolac series material.

The bright point defects occurring in the liquid crystal panel 390 include not only a bright point defect occurring due to an electrical short at a gate or data line and the TFT, but also a bright point defect occurring due to particles remaining in the pixel region during the corresponding process.

Micro-drilling is a method of forming a hole of a predetermined depth on the first or second substrate at a position corresponding to the defect by using a micro-drill having a fine or small diameter.

Alternatively, a hole is formed on an outer surface of the first or second substrate at a position corresponding to the bright point by using a micro-screw device. Thereafter, a wedge is inserted into the formed hole, and the bright point is darkened to prevent light from being transmitted at the defective position.

Here, the repairing method may be applied to one or both of the first and second substrates.

The wedge may be made of a solid polymer or a metal with a polymer.

Figure 4:
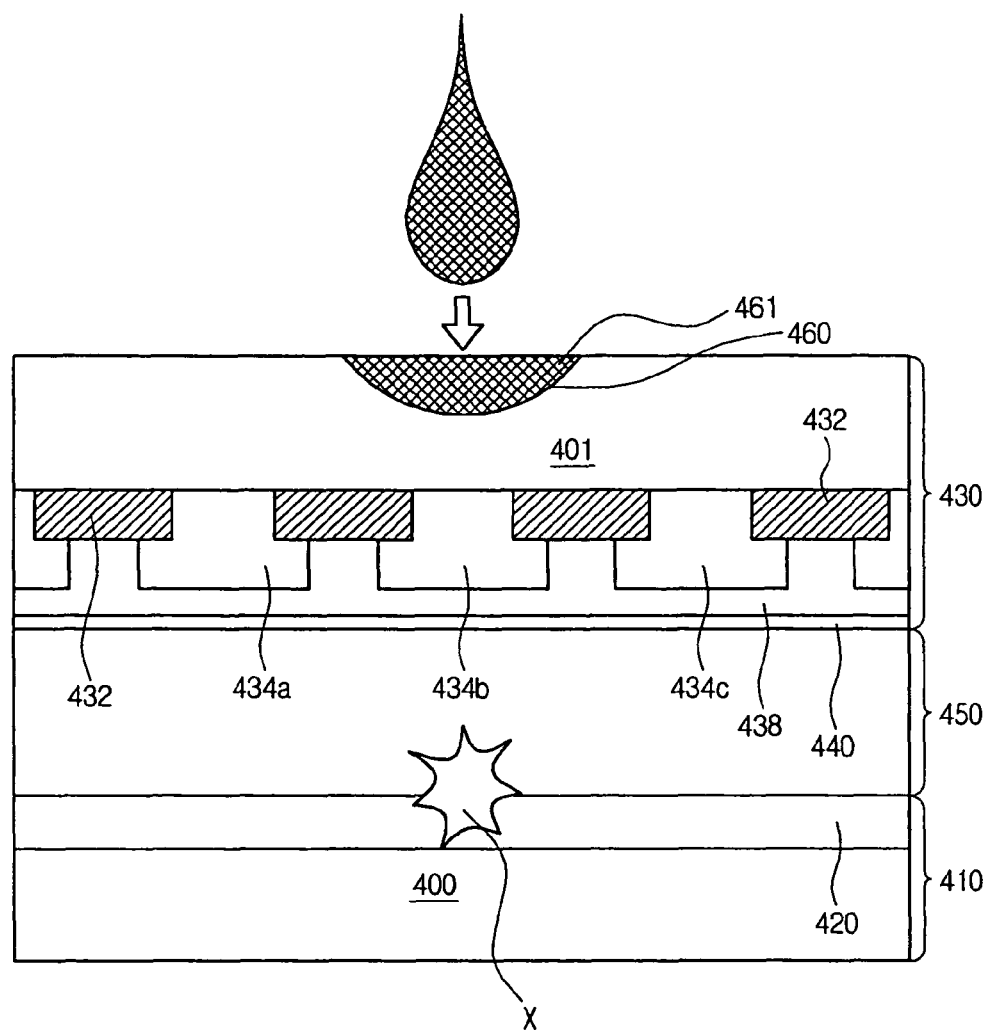
FIG. 4 is a view illustrating a method of repairing a defective cell of a liquid crystal panel according to an embodiment of the present invention.

FIG. 4 is a view illustrating a method of repairing a defective cell of a liquid crystal panel according to an embodiment of the present invention. Although FIG. 4 illustrates a TN mode liquid crystal display panel, this is by way of example only, and it is understood that the present invention encompasses other liquid crystal display panels, such as in-plane switching (IPS) mode, vertical alignment (VA) mode, and fringe field switching (FFS) mode panels as well.

Referring to FIG. 4, first and second substrates 410 and 430 are disposed to face each other, and a liquid crystal layer 450 is interposed between the first and second substrates 410 and 430.

An array element 420 is formed on a transparent substrate 400 of the first substrate 410, and R/G/B color filters 434A, 434B and 434C are sequentially arranged on a transparent substrate 410 of the second substrate 430. A black matrix 432 is formed at each boundary between the R/G/B color filters 434A, 434B and 434C. An overcoat layer 438 and a common electrode 440 are sequentially formed on the R/G/B color filters 434A, 434B and 434C and the black matrix 432.

The array element 420 includes a TFT disposed at an intersection of gate and data lines in each pixel region defined by the gate and data lines, and a pixel electrode connected to the TFT.

When a bright point and a white point occur in the liquid crystal panel due to a defective cell X, a hole 460 is formed on an outer surface of the transparent substrate 400 or 401 of the first or second substrate 410 or 430 at a position corresponding to the defective cell by using a micro-drill. Thereafter, a pigment 461 is filled in the hole 460, thereby darkening the bright point.

The pigment 461 may be any material capable of blocking light, such as an acryl series material or a Novolac series material.

The micro-drilling is a method of forming the hole 460 of a predetermined depth on the transparent substrates 400 or 401 at a position corresponding to the defective cell X by using a micro-drill having a fine diameter.

Preferably, the substrate is micro-drilled to remain about 20 µm thick. This is to prevent the liquid crystal inside the substrate from being contaminated due to the pigment when the substrate is completely perforated.

To fill the hole 460 with the pigment 461, an inkjet method, a printing method, an injection method or the like can be used.

The inkjet method prints pigment on a desired site (hole).

The printing method includes printing pigment on a substrate and removing the pigment printed on a non-desired site when the pigment is filled in the desired site (hole).

In the liquid crystal panel of the above construction, since light incident into a failure site is shielded by the pigment filled in the micro hole of the substrate. The light does not pass through the liquid crystal panel, so a bright point defect or foreign particle white point can be readily prevented.

The repair method that converts the defect point into a dark point may be applied to either the first substrate or the second substrate, or both of the first and second substrates.

Figure 5A:
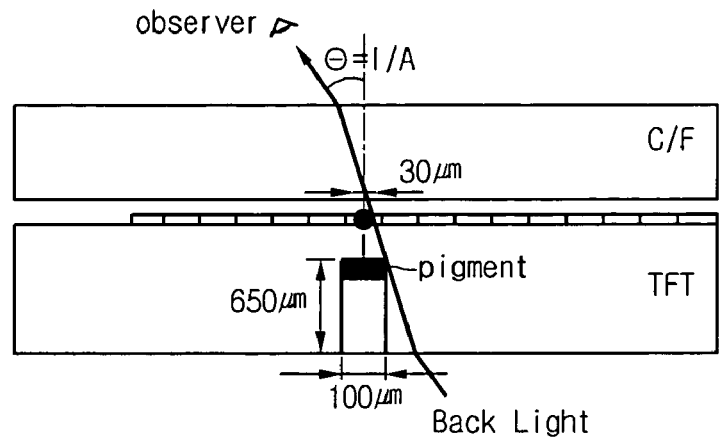
FIGS. 5A and 5B are views illustrating a relationship between a hole depth and an angle at which a light leakage occurs in a defective cell region.
Figure 5B:
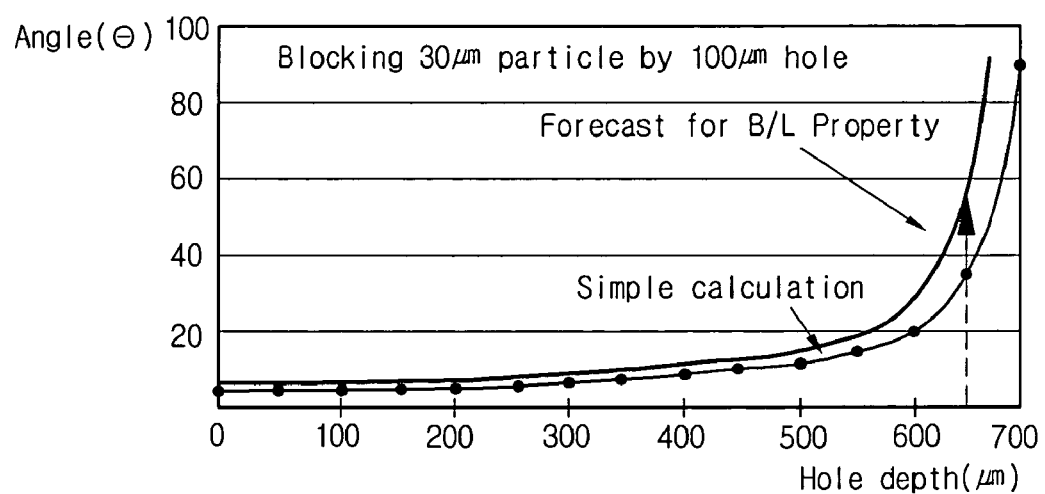

FIGS. 5A and 5B are views illustrating a relationship between a hole depth and an angle at which a light leakage occurs in a defective cell region.

Referring to FIGS. 5A and 5B, when a bright point defect occurs in any one of cell regions of an liquid crystal panel, a hole is formed at the defective cell region and a pigment is filled in the formed hole to darken the bright point.

The bright point defect is generated because light generated from a backlight is undesirably refracted or scattered by the electrical short defect at the gate or data line and the TFT or the particle defect occurring in the pixel region during the corresponding process.

In the present invention, an angle (hereinafter referred to as an identification angle (I/A)) between a reference line perpendicular to the pixel region and a point at which an observer can perceive an initial bright point defect is maximized so that the bright point defect cannot be viewed by the observer while the liquid crystal panel is displayed.

That is, the I/A is maximized so that the observer cannot sense the bright point defect in the range of a viewing angle.

Particularly, since the I/A increases as the hole filled with the pigment increased in depth, that is, as the pigment approaches the bright point defect region, it is possible to adjust a region where the bright point defect is sensed.

For example, when a particle defect of about 30 µm occurs the pixel region, if the pigment is filled in the hole of 650 µm, the I/A θ approaches 60° toward one surface of the liquid crystal panel with respect to the reference line perpendicular to the pixel region.

That is, a refracting or scattering angle of a traveling light is increased with an increase in the depth of the hole, and thus the observer cannot sense the bright point (light leakage) defect in the range of left and right 60° from the front of the liquid crystal panel (that is, a total of 120°).

According to the present invention, the leaking light due to the bright point defect is sensed only a region of 30° toward the reference line from the surface of the liquid crystal panel, and the bright point defect cannot be perceived by the observer in the display region (that is, the 120° region). That is, in the 120° region, the bright point defect is blocked by the pigment formed in the hole such that it cannot be sensed by the observer.

The inventive method of forming the hole to repair the cell defective region is differentiated from a conventional method of dotting a light blocking or reflecting ink on a substrate to prevent the cell defective region.

The conventional ink dotting method merely blocks the light generated at the backlight from traveling toward the bright point defective region, thereby preventing the bright point defect in the perpendicular front region. However, the ink dotting method cannot prevent the light leakage defect in an inclined direction.

Moreover, when the dotted region is increased so as to completely prevent the light leakage defect region, a bright point defect is undesirably generated due to a light reflection or scattering by the dotted ink.

However, the inventive light leakage blocking method can adjust the light leakage blocking region only by the adjustment of the hole depth (that is, the distance between the pigment and the defective region), thereby making it possible to greatly increase the view angle range where the light leakage is blocked.

Figure 6:
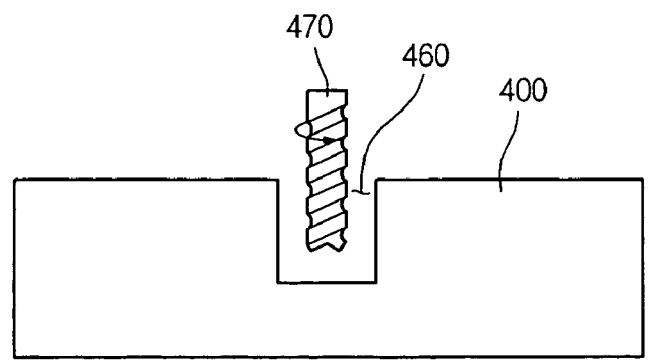
FIG. 6 is a view illustrating a process of forming a hole with a micro-drill for the repairing method according to the present invention.

FIG. 6 is a view illustrating a process of forming a hole with a micro drill for the repairing method according to the present invention.

Referring to FIG. 6, a hole is formed on a substrate 400 by using a micro drill 470. The formed hole corresponds to a region where the bright point defect occurs, and the diameter of the hole may be varied according to the type and range of the bright point defect.

That is, when the bright point defect occurs in the entire sub-pixel due to the electrical short of the data line of the TFT, the hole is formed to a size corresponding to the sub-pixel. When the bright point occurs due to a small amount of particle in the sub-pixel, the hole is formed to a size corresponding to the particle.

Figure 7:
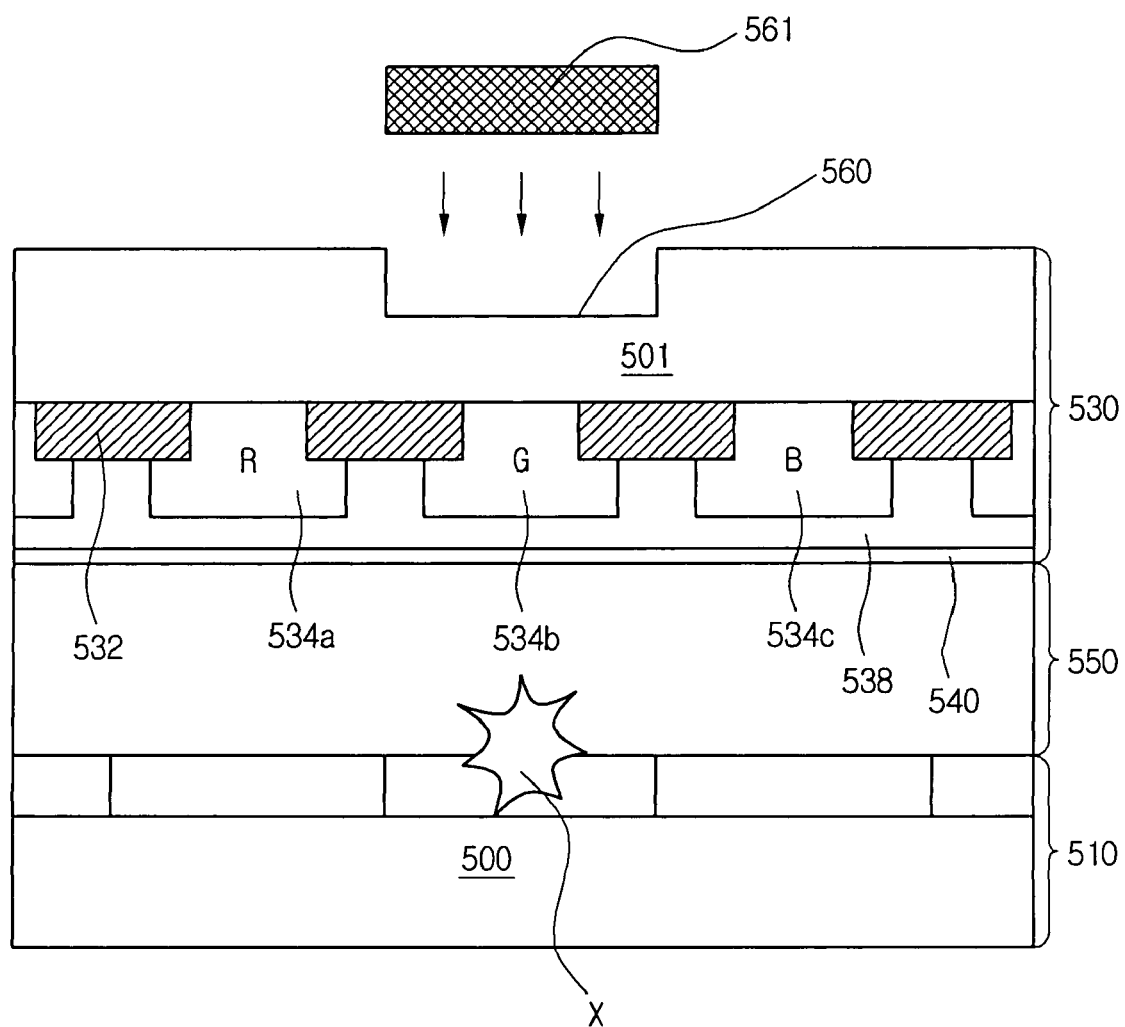
FIG. 7 is a view illustrating a method of repairing a defective cell of a liquid crystal panel according to another embodiment of the present invention.

FIG. 7 is a view illustrating a method of repairing a defective cell of a liquid crystal panel according to another embodiment of the present invention.

Referring to FIG. 7, when a bright point or foreign particle white point is generated due to a defective cell 'X' in a completed liquid crystal panel, a hole 560 is formed at an outer corresponding site of a transparent substrate 400 or 401 of a first substrate 410 or a second substrate 430 to the site of the defective cell 'X', using a micro-screw. A wedge 561 is inserted into the hole 560 to convert the defective cell 'X' into a dark point.

The wedge 561 is manufactured to have the same shape as the micro drill, is inserted into the hole region, and is then cut suitably.

The wedge 561 is formed of a polymer or a metal by a polymer.

The hole 560 formed in the defect site is made in a diameter of about 20 to 400 μm.

The repair method that converts the defect point into a dark point may be applied to either the first substrate or the second substrate, or to both of the first and second substrates.

As described above, the hole is formed on the external surface of the substrate at a position corresponding to the bright point or the white point generated in the liquid crystal panel, and the pigment or the wedge are filled in the hole. Accordingly, the liquid crystal panel can be easily repaired and the yield and production thereof can be greatly enhanced.

Also, the defective cell of the liquid crystal panel can be repaired even after the substrates are attached together. Accordingly, the product quality and reliability can be greatly enhanced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of repairing a liquid crystal display (LCD) having a first substrate and a second substrate with liquid crystal material disposed therebetween, the method comprising:

forming a hole on a first or second substrate at a position corresponding to a defective pixel, wherein the hole is formed such that a depth of the hole is greater than a remaining thickness of the substrate, wherein the hole is formed such that an observer cannot sense light leakage from the defective pixel in a range of left and right about 60 degrees from the front of the liquid crystal display; and inserting a wedge into the hole, wherein inserting the wedge comprises inserting a solid object into the hole, wherein the hole is formed by using a micro-screw, wherein the hole is formed such that the remaining substrate has a thickness of about 20 μm,
wherein the hole depth is 650 μm or more,
wherein the wedge is made of a solid polymer or a metal with a polymer.

2. The method of claim 1, wherein inserting the wedge further comprises breaking off and leaving a portion of the object in the hole.

3. The method according to claim 1, wherein the hole is formed to have a diameter of approximately 20 to 400 μm.

4. A method of repairing a liquid crystal display (LCD) having a first substrate and a second substrate with liquid crystal material disposed therebetween, the method comprising:

forming a hole on a liquid crystal panel at a position corresponding to a defective pixel, wherein the hole is formed such that a depth of the hole is greater than a remaining thickness of the substrate, wherein the hole is formed such that an observer cannot sense light leakage from the defective pixel in a range of left and right about 60 degrees from the front of the liquid crystal display; and forming a repair pattern in the hole,
wherein the hole is formed by using a micro-screw or micro drill,
wherein the hole is formed such that the remaining substrate has a thickness of about 20 μm,
wherein the hole depth is 650 μm or more,
wherein the repair pattern is a wedge,
wherein the wedge is formed by inserting a solid object into the hole,
wherein the wedge is made of a solid polymer or a metal with a polymer.

5. The method of claim 4, wherein the defective pixel includes a defect area.

6. The method according to claim 4, wherein the hole is formed to have an area substantially larger than the defect area.

7. The method according to claim 4, wherein the repair pattern darkens the defective pixel.

8. The method according to claim 4, wherein the hole is formed on one or both of first and second substrates.

9. The method according to claim 4, wherein the hole is formed on an outer surface of the liquid crystal panel.

10. An LCD comprising:

a first substrate on which a pixel electrode and a TFT are formed in a pixel region formed in a matrix pattern;

a second substrate on which a color filter layer and a black matrix are formed, the second substrate facing the first substrate;

a hole formed on an outer surface of the first or second substrate to repair a defective pixel, wherein a depth of the hole is greater than a remaining thickness of the substrate, wherein the hole is formed such that an observer cannot sense light leakage from the defective pixel in a range of left and right about 60 degrees from the front of the liquid crystal display; and a repair pattern formed in the hole,
wherein the hole is formed by using a micro-screw or micro drill,
wherein the hole is formed such that the remaining substrate has a thickness of about 20 μm,
wherein the hole depth is 650 μm or more,
wherein the repair pattern is a wedge,
wherein the wedge is formed by inserting a solid object into the hole,
wherein the wedge is made of a solid polymer or a metal with a polymer.

11. The method of claim 10, wherein the defective pixel includes a defect area.

12. The method according to claim 10, wherein the hole is formed to have an area substantially larger than the defect area.

13. The LCD according to claim 10, wherein the hole is formed to have a diameter of approximately 20 to 400 μm.

14. The LCD according to claim 10, wherein the hole is formed at a position corresponding to the defective pixel.

15. The LCD according to claim 10, wherein the repair pattern blocks light to darken the defective pixel.

16. A method of repairing a defective pixel in a liquid crystal display (LCD) having a first substrate and a second substrate with liquid crystal material disposed therebetween, the method comprising:

determining the size of a defect area in the defective pixel;

forming a hole to a predetermined depth in the first or second substrate, forming said hole at a position corresponding to the defect area in the defective pixel;

forming a repair pattern in the hole, wherein the predetermined depth of the hole corresponds to the size of defect area, wherein the hole is formed such that a depth of the hole is greater than a remaining thickness of the substrate, wherein the hole is formed such that an observer cannot sense light leakage from the defective pixel in a range of left and right about 60 degrees from the front of the liquid crystal display, wherein the hole is formed by using a micro-screw or micro drill, wherein the hole is formed such that the remaining substrate has a thickness of about 20 μm, wherein the hole depth is 650 μm or more, wherein the repair pattern is a wedge, wherein the wedge is formed by inserting a solid object into the hole, wherein the wedge is made of a solid polymer or a metal with a polymer.

17. The method of claim 16, wherein the identification angle relating to the depth of the hole and the size of the defect area is less than fifty degrees.

* * * * *